US010240745B2

(12) United States Patent
Potter et al.

(10) Patent No.: US 10,240,745 B2
(45) Date of Patent: Mar. 26, 2019

(54) FIBER OPTIC LIGHT PANEL DEVICE WITH PLURAL OUTPUTS

(71) Applicant: Valeo North America, Inc., Troy, MI (US)

(72) Inventors: Brant Potter, Seymour, IN (US); John Orisich, Seymour, IN (US); Kayla Greene, Seymour, IN (US); P. Davis Baker, Seymour, IN (US); Christophe Dubosc, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/359,005

(22) Filed: Nov. 22, 2016

(65) Prior Publication Data

US 2018/0142860 A1  May 24, 2018

(51) Int. Cl.
*B60Q 1/30* (2006.01)
*B60Q 1/34* (2006.01)
*F21S 43/236* (2018.01)
*F21S 43/20* (2018.01)
*F21S 43/14* (2018.01)
*B60Q 1/00* (2006.01)
*F21S 43/243* (2018.01)
(Continued)

(52) U.S. Cl.
CPC .......... *F21S 43/236* (2018.01); *B60Q 1/0058* (2013.01); *B60Q 1/30* (2013.01); *B60Q 1/34* (2013.01); *F21S 43/14* (2018.01); *F21S 43/243* (2018.01); *F21S 43/245* (2018.01); *F21S 43/247* (2018.01); *F21S 43/249* (2018.01); *F21S 43/255* (2018.01); *F21S 43/16* (2018.01); *F21Y 2115/10* (2016.08)

(58) Field of Classification Search
CPC .. F21S 48/2231; F21S 48/215; F21S 48/2218; F21S 48/2243; F21S 43/236; F21S 43/239; F21S 43/14; F21S 43/16; F21S 43/241; F21S 43/245; F21S 43/247; F21S 43/255; B60Q 1/30; B60Q 1/34; B60Q 1/0058
USPC ..................... 40/547, 556; 362/511
See application file for complete search history.

(56) References Cited

U.S. PATENT DOCUMENTS 4,389,698 A * 6/1983 Cibie ................... F21S 41/24
  362/511
4,977,487 A * 12/1990 Okano ..................... B60Q 1/50
  362/555
(Continued)

FOREIGN PATENT DOCUMENTS

EP  0 359 450 A2  3/1990
FR  2715714 A1 *  8/1995  ........... G02B 6/0008
(Continued)

OTHER PUBLICATIONS

Jacques Le Gars, Aug. 1995, Description FR2715714, Patent Translate Powered by EPO and Google, pp. 1-7.*

*Primary Examiner* — Alan B Cariaso
(74) *Attorney, Agent, or Firm* — Oblon, McClelland, Maier & Neustadt, L.L.P.

(57) ABSTRACT

A lighting device for a vehicle includes a lighting module for a vehicle having a light source and a panel optically coupled to the light source. The panel includes a plurality of fibers, and a first illumination region of first light output for a first vehicle lighting function and a second illumination region of second light output for a second vehicle lighting function.

17 Claims, 7 Drawing Sheets

(51) Int. Cl.
    *F21S 43/245*     (2018.01)
    *F21S 43/249*     (2018.01)
    *F21S 43/247*     (2018.01)
    *F21Y 115/10*     (2016.01)
    *F21S 43/16*     (2018.01)

(56) References Cited

U.S. PATENT DOCUMENTS

| | | | | |
|---|---|---|---|---|
| 5,111,183 | A * | 5/1992 | Wang | B60Q 1/0011 340/479 |
| 5,193,893 | A * | 3/1993 | Mitko | B60Q 1/0011 340/468 |
| 5,890,796 | A * | 4/1999 | Marinelli | B60Q 1/0011 362/307 |
| 6,874,925 | B2 * | 4/2005 | Page | G02B 6/0008 362/554 |
| 6,880,276 | B2 * | 4/2005 | Strein | G09F 9/305 385/115 |
| 7,556,412 | B2 * | 7/2009 | Guillermo | A42B 3/044 362/551 |
| 9,810,826 | B2 * | 11/2017 | Chestakov | G02B 19/0066 |
| 2003/0189836 | A1 | 10/2003 | Sparling et al. | |
| 2011/0110111 | A1 * | 5/2011 | Rho | F21S 41/143 362/509 |

FOREIGN PATENT DOCUMENTS

| | | | | |
|---|---|---|---|---|
| WO | WO-2016059225 A2 * | 4/2016 | | B60Q 3/54 |
| WO | WO 2016204779 A1 * | 12/2016 | | G02B 6/001 |

* cited by examiner

FIG. 9

FIBER OPTIC LIGHT PANEL DEVICE WITH PLURAL OUTPUTS

FIELD OF THE INVENTION

This invention relates to lighting systems, and more particularly to a lighting and/or signaling device that utilizes at least one fiber optic light panel to provide more than one light output.

BACKGROUND OF THE INVENTION

As is well known, vehicles contain numerous types of lighting devices. For example, exterior vehicle lighting devices that perform a stop light function, tail lamp function, head lamp function, daytime running light function, dynamic bending light function, and a fog light function are common.

In an effort to reduce traffic accidents, most governments provide safety regulations that specify vehicle lighting performance requirements. For example, as of the date of this filing Federal Motor Vehicle Safety Standards (FMVSS) No. 108 specifies the minimum photometric intensity for vehicle stop lamps (i.e. brake lights) on vehicles operated within the U.S. Vehicle manufacturers must design vehicle lighting devices to meet the technical requirements of these or similar standards around the world. In recent years, vehicle lighting has also become important for its aesthetic appeal to consumers. Thus, vehicle manufacturers have made an effort to design vehicle lighting devices in consideration of the styling of the vehicle on which the lighting devices are mounted. Further, vehicle manufacturers may provide optional lighting effects (in addition to the required lighting functionality) to enhance vehicle styling.

It is difficult to provide aesthetically appealing vehicle lighting devices that meet the required technical specifications. For example, taillights on existing cars tend to be power hungry and need various components, such as reflectors. Head lamps are similar in that they require multiple components, such as reflectors, cut off devices and the like. Aesthetic lighting effects lead to an even greater number of components and complexity. Such vehicle lighting devices are not easily adapted to the styling of the vehicle.

In recent years some vehicle manufacturers are utilizing organic light-emitting diodes (OLED) in an effort to meet desired lighting and aesthetic characteristics of vehicle lighting. OLED devices generally take the form of very thin panels that can be formed into three-dimensional shapes. Fiber panel LEDs may have a similar panel form to OLEDs. For example, U.S. Pat. No. 6,874,925 discloses fiber optic light emitting panel assemblies. However, these assemblies have generally been limited to LCD backlighting, surgical devices, phototherapy and other applications not subject to the technical requirements of vehicle lighting.

SUMMARY OF THE INVENTION

It is one object of the invention to provide a fiber optic light panel device that can meet the technical and aesthetic requirements for vehicle lighting.

Another object of the invention is to provide a fiber optic light panel device that can conform to the styling of a vehicle.

Yet another object of the invention is to provide fiber optic vehicle light panel that enhances aesthetics of the vehicle design in an unlit state.

These and/or other objects may be provided by embodiments of the invention disclosed herein.

In one embodiment a lighting device for a vehicle includes a lighting module for a vehicle having a light source and a panel optically coupled to the light source. The panel includes a plurality of fibers, and a first illumination region of first light output for a first vehicle lighting function and a second illumination region of second light output for a second vehicle lighting function. The plurality of fibers may include an array of fibers that is abraded, and the array of fibers outputs light through at least one of an axial or planar direction of the panel. At least one portion of the panel is curved.

In some aspects, the panel may have at least one region having of one of a red, amber, and white light output color. At least one portion of the panel may be red in light output color, and the lighting module functions as a tail lamp by illuminating the light source. At least one portion of the panel can have one of a red and amber color, and the lighting module functions as a turn signal indicator by alternately illuminating the light source.

The lighting module can include a second light source and a second array of fibers coupled to the second light source, where the second fiber array is disposed behind the first fiber array. The second fiber array can be configured to emit light axially at an end of the second fiber array. The second fiber array can be abraded and also emits light in a planar direction through the panel. The second fiber array may be interwoven with the first fiber array, and both the first and second fiber arrays may emit light through a common portion of the panel. The second fiber array may be disposed adjacent to the first fiber array such that light emitted by the first fiber array is emitted through a first portion of the panel, and light emitted by the second fiber array is emitted through a second portion of the panel. The panel can include a sub-panel having a another fiber array and disposed on a first side with the fiber array and substantially parallel to at least a portion of the panel.

The lighting module can include a cap disposed at an end of the fiber array, and the cap can be opaque and prevent axial light emission by the fiber array. At least one portion of the cap can be translucent, having of one of a red and amber color, and the lighting module functions as a side marker lamp by illuminating the second light source.

A portion of the panel can be specially designed to enhance at least one of the first and second light outputs.

Another aspect of the panel includes a method of manufacturing a lighting module for a vehicle. The method includes providing a light source for generating light, and providing a panel optically coupled to the light source. The panel includes a plurality of optical fibers arranged in a predetermined form to define a plurality of illumination regions from which light is emitted to satisfy a plurality of respective vehicle lighting functions of the fiber array. The method may further include providing a second light source, and providing a panel includes providing a panel having a first fiber array, coupled to the first light source and coupled to the second light source such that the second fiber array emitting second light from the fiber panel. The second fiber array can be abraded and may also emit light in a planar direction through the first fiber panel. A cap may be provided which is opaque and prevents axial light emission by the fiber array. At least one portion of the cap can be translucent, having of one of a red and amber color.

DETAILED DESCRIPTION OF SEVERAL EMBODIMENTS

Fiber optic light panels have previously been used in backlighting liquid crystal displays and electronic controls. Patent application serial no. PCT/US2015/036629 (unpublished) titled Fiber Optic Lighting And/or Signaling System for a Vehicle, filed on Jun. 19, 2015 by the same Applicant as the present application, discloses a fiber optic light panel device for exterior lighting of vehicles. The entire contents of this application are incorporated herein by reference.

A fiber optic light panel assembly generally includes a light source that inputs light to a fiber bundle having fibers extending therefrom to form a light panel. Conventionally, a reflective backing is provided on one side of the panel to reflect emitted light to a light output side of the panel. This side emitted light is used to perform some lighting function. For example, Published Patent Application EP 0359450 discloses a phototherapy device which uses a fiber optic light panel integrated with a blanket such that a light emitting side of the panel emits light incident to the patient's skin. The present inventors have recognized, however, that a light panel can provide additional light outputs which can serve as a secondary light source such that the panel can provide two automotive lighting functions. The lighting systems described herein can be adapted to meet motor vehicle regulations worldwide.

Figure 1:
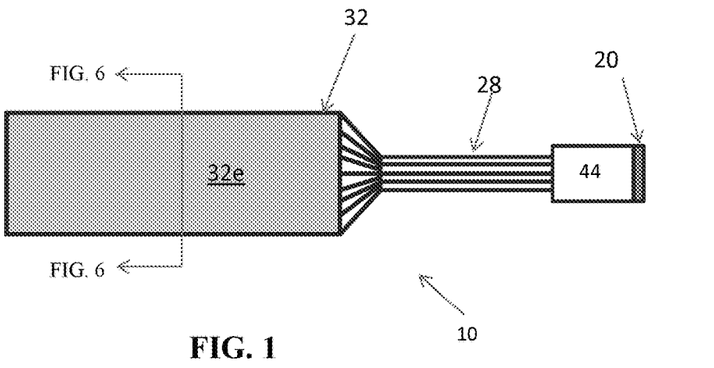
FIG. 1 is a schematic view of a fiber optic light panel device in accordance with embodiments of the invention.

FIG. 1 is a schematic representation of a lighting system in accordance with an embodiment of the invention. The lighting system 10 includes a light source 20, a fiber bundle 44, and a fiber panel 32. The light source 20 generates light for coupling to the fiber panel 32, which emits light from one or more surfaces thereof to meet at least one desired lighting function. One light emitting side of the panel 32 is indicated by 32e in FIG. 1. According to embodiments of the invention, light may also be emitted from an opposite side of the panel 32 and/or from an end of the panel 32, as will be further discussed below. The fiber bundle 44 groups fibers of the panel 32 in a configuration suitable for accepting light into the fiber panel 32.

The light source 20 may be any suitable source for generating light having photometric characteristics to provide a desired light output from panel 32. For example, the light source 20 may provide a lambertion pattern or any other radiation pattern of suitable flux, wavelength and intensity to satisfy the lighting function or aesthetic lighting effects of the panel 32. The light source 20 may include one or more light emitting devices or solid state light sources. The term "solid state" generally refers to light emitted by solid-state electroluminescence, as opposed to incandescent bulbs or fluorescent tubes. For example, the light source 20 may include a semiconductor light emitting diode (LED) or laser diode, an OLED, polymer light emitting diode (PLED), an LED lamp package, LED chip or LED die, or an array of one or more of these devices. Where a plurality of LEDs is used, they can be the same or different colors. It should be understood that the light source 20 could be multiple discrete LEDs or an LED light bar. A conventional printed circuit board (PCB) having one or more LEDs could be used with the optical fiber panel 32. In one example, the light source may be an LED providing a 2 W, 140 lm output at 2.65 v and 750 mA of current. Alternatively, a 860 mA, 6.29V, 510 lm white 1×2 LED source may be provided as light source 20. Halogen bulbs and/or an HID source may also be used.

Figure 2:
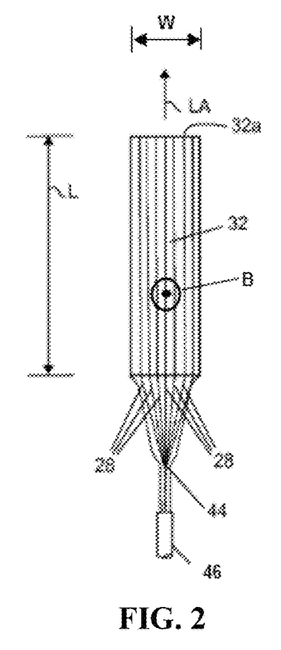
FIG. 2 is a planar view of a fiber optic light panel used in a lighting device according to embodiments of the invention.

FIG. 2 is a view of a fiber optic light panel used in a lighting system according to embodiments of the invention. The fiber optic light panel 32 includes a plurality of optical fibers 28 that extend along a length L of the panel 32, terminating at an end 32a of the panel. The fibers 28 are arranged in an array along a width W such that they define a generally planar and generally rectangular panel 32. The panel 32 may assume other arrangements and forms and is not limited to rectangularity and/or straight lines. For example, the panel 32 may have a width W that generally exceeds a length L. In example embodiments, the panel 32 is pliable and flexible, and may be adapted to be received in a support or frame which may define a three dimensional form of the light panel 32.

In the embodiment of FIG. 2, the plurality of optical fibers 28 are arranged in a generally parallel relationship with respect to each other and with respect to a longitudinal axis LA of the panel 32. However, it should be understood that the plurality of optical fibers 28 may assume similar or different positions (e.g., parallel, non-parallel, curved, arcuate or serpentine). For example, some of the plurality of optical fibers 28 may be straight while others are not. Further, although the plurality of optical fibers 28 are shown extending along the entire length L of the panel 32, respectively, some or all of the plurality of optical fibers 28 could extend less than the entire length. The plurality of optical fibers 28 could be longer than the length L and arranged, for example, in a circular, elliptical, polygonal or other pattern within the panel 32.

It should be understood that the panel 32 may include any number of fibers 28 depending on the environment in which they are going to be used. In some of the embodiments, there are approximately fifty (50) fibers of 0.23 mm diameter per panel 32, or 100 fibers per inch width W (per layer). Obviously, these are just illustrations and other numbers and sizes of fibers 28 could be used. Also, the plurality of optical fibers 28 may have different sizes or dimensions, such as different diameters. Thus, the plurality of optical fibers 28 can be different shapes, dimensions and sizes and are adapted and arranged in the predetermined form depending on the light pattern or lighting function desired.

A conventional optical fiber generally transmits light through total internal reflection (TIR) from an input end to an output end of the fiber. According to some embodiments of the invention, the fibers 28 of the optical light panel system 10 may be configured and/or arranged such that at least a portion of light is emitted along a length of the fibers 28 making the panel 32 illuminate in a direction that is generally not parallel with a longitudinal axis LA of the fiber, as shown by point B in FIG. 2, which represents light rays coming out of the plane of the page.

Figure 3:
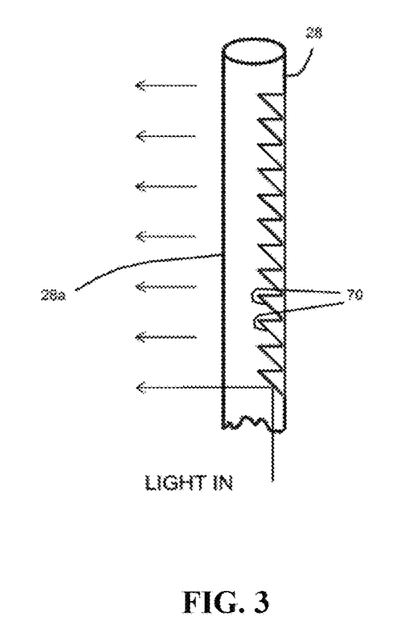
FIG. 3 is a schematic view of an optical fiber adapted to emit light along a length of the optical fiber.

FIG. 3 is a schematic view of an optical fiber adapted to emit light along a length of the optical fiber. To facilitate the light being emitted generally transverse to a longitudinal axis of the fiber 28, the fiber 28 may be modified to include optics such as a plurality of facets or reflective surfaces 70 which direct or reflect the light through a surface 28a of the fiber 28. Altering the fibers 28 to direct light in the desired direction can be achieved through a variety of methods including, but not limited to: providing the plurality of facets or reflective surfaces 70 as mentioned, laser ablating a surface of the fiber 28, mechanical abrasion of a surface of each fiber 28, etc. Further, depth, density and type of the alterations may be varied along the length of the fiber to achieve different light output effects along the fiber. For example, spacing between reflective surfaces 70 may be varied in different portions of the fiber to achieve more or less light intensity at the surface 28a of the fiber and/or to permit more or less light to be emitted from an end of the fiber 28.

Figure 4:
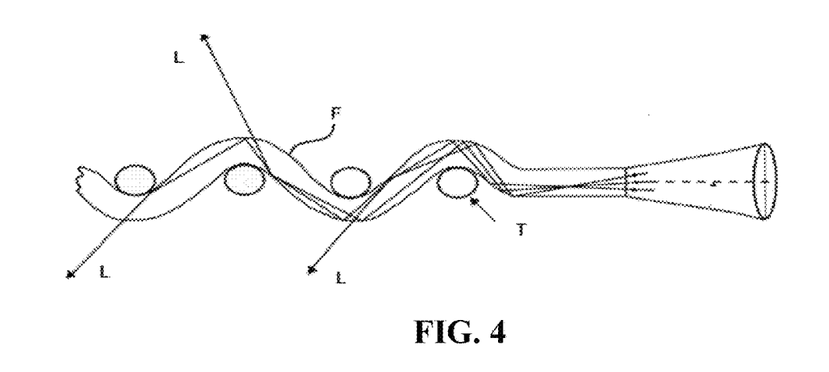
FIG. 4 is a schematic view of another optical fiber adapted to emit light along a length of the optical fiber.

FIG. 4 is a schematic view of another optical fiber adapted to emit light along a length of the optical fiber. It has been found that wrapping or curving the fiber may also cause light to exit a side surface of the fiber F as shown in FIG. 4. Thus, causing at least one or a plurality of the optical fibers 28 to be curved along their longitudinal axis can enable the fibers to emit light or illuminate into a predetermined or desired direction, such as the direction indicated by point B in FIG. 2. It may be desirable to capitalize on this feature by providing a woven pattern of the plurality of optical fibers 28 with fill thread T in order to generate a predetermined lighting function or result. A variety of weave patterns may be selected to produce a desired lighting function, effect or characteristic. In some embodiments, a light panel may include fibers which are altered as discussed in FIG. 3, and also woven as shown in FIG. 4. Combinations of fiber alteration and weave may be used to achieve spatial effects for light output from the panel 32, as will be discussed below. In a case an optical fiber 28 is straight, light is transmitted through an interior of the fiber by TIR. In a case the optical fiber 28 is not straight (such as illustrated by FIG. 5A, 5B), where there is a bend of sufficient radius in the fiber light may be transmitted along an interior length of the optical fiber 28 and also emitted to outside the optical fiber 28 at one or more points along the length of the optical fiber 28.

Returning again to FIG. 2, the plurality of optical fibers 28 extend out of the panel 32 and are gathered and combined in a bundle 44 which functions as a light-receiving end or input end of the panel 32. The fiber bundle 44 may include any bundling element or substance suitable to maintain the fibers 28 in a predetermined cross sectional shape.

Figure 5A:
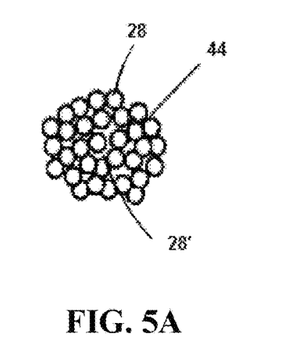
FIGS. 5A and 5B show alternative embodiments of a fiber bundle and bundling elements used in a lighting system in accordance with embodiments of the invention.
Figure 5B:
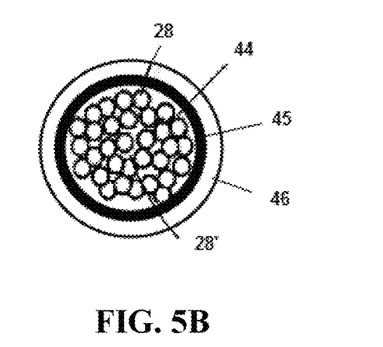

FIGS. 5A and 5B show alternative embodiments of a fiber bundle 44 and bundling elements used in a lighting system in accordance with embodiments of the invention. As seen in FIG. 5A, the fiber bundle 44 may be maintained by adhesive 28' provided between the fibers 28 as the bundling element to bond the fibers together. Alternatively, the fiber bundle 44 may be maintained by a coupling, 46 (such as a ferrule) as shown in FIG. 5B. The bundle 44 may also include a wrap, sleeve, adhesive, tape, resin or the like to facilitate holding the fibers 28 in the bundled position as illustrated by 45 in FIG. 5B.

Figure 6:
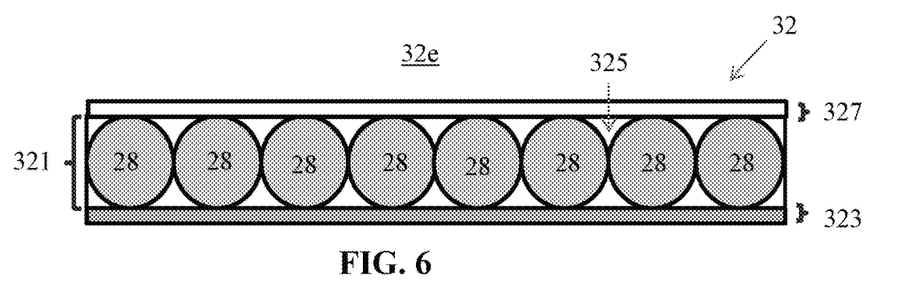
FIG. 6 provides a schematic view of a cross-section of the fiber optic light panel of FIG. 1 in accordance with embodiments of the invention.

FIG. 6 provides a schematic view of a cross-section of the fiber optic light panel of FIG. 1 in accordance with embodiments of the invention. As seen, the panel 32 includes a fiber portion 321 which includes a plurality of fibers 28 arranged side-by-side in an array, which may be encapsulated in a surrounding material 325 such as resin. The panel 32 may optionally include optical portions positioned on one or more sides of the fiber layer to enhance a particular characteristic of a light output from the panel. For example, portion 323 may be a reflective portion that reflects light output from a backside of the fibers 28 to facilitate light output from a single side of the panel 32 in illumination region 32e. As another example, portion 327 may be a light transmission portion 327 to achieve various optical effects (such as wavelength filtering) to light output from the fibers 28. While shown in direct contact, one or more layers having optical properties may be interposed between the fiber layer 321 and other layers of the panel 32. Further, while shown as planar layers in FIG. 6, portions 321, 323 and 327 may be other non-planar forms. Further, the terms "portion" and "layer" are used interchangeably herein and encompass single and multilayer structures, as well as integral structures having added materials and/or optical structures formed thereon.

Embodiments of the invention may modify fiber portion 321 to achieve different light outputs from a panel. Further, portions 323 and 327, and/or other optical portions may be added to the panel 32 to achieve different light outputs from a panel 32 for satisfying additional lighting functions in an automotive context. According to embodiments of the invention, at least one layer of the lighting panel 32 is chosen to facilitate different light outputs from the panel 32 to different vehicle lighting function. In one example, the fiber layer 321, reflective layer 323 and/or transmission layer 327 may be selected or altered to achieve different light types output from the panel 32. Light type can include color, hue, tint, tone and/or shade of the light output, as well as intensity, brightness or any other desired photometric characteristic in any light output region of the panel 32.

Functions of a vehicle lighting assembly may include at least one of a tail lamp, stop lamp, high mounted stop lamp, turn signal indicator, side marker lamp, backup lamp, and license plate lamp. Aesthetic design considerations may include uniformity of light output, color, texture, shape and curvature of panels, in lit and unlit states, and backing panel color. Table 1 represents an example set of lighting requirements where tail lamps, stop lamps, and side marker lamps may be red. Rear turn signal lamps may be red or amber. Back up lamp and license plate lamp may be white.

TABLE 1

Lamps Functions and Colors

| Lamp Function | Color |
|---|---|
| Tail | Red |
| Stop | Red |
| Rear Turn Signal | Red or Amber |
| Rear Side Marker | Red |

TABLE 1-continued

Lamps Functions and Colors

| Lamp Function | Color |
| --- | --- |
| Backup | White |
| License Plate | White |

Amber may be produced as a combination of red and green light. Some fiber panels may have sections of various colors, textures, and shapes, for example a first section may be red while a second section may be white. In another example, a first section may be amber and a second section may be red. Further, a person having ordinary skill in the arts would understand that lamp functions and colors may be grouped in other combinations and arrangements. FIGS. 7A-7G represent some possible combinations and arrangements.

In some embodiments, the fiber layer 321, reflective layer 323 and/or transmission layer 327 can be varied in texture, material composition or other physical properties to achieve certain light output characteristics in the illumination regions such as region 32e. In one example, a texture of the reflective layer 323 can be varied to achieve a desired degree of diffusivity from the panel 32. Further, any of the layers 321, 323, 327 can be enhanced with pigments, nanoparticles, phosphors or other additives to change optical of the panel. In one example, phosphors can be included in any portion of the panel 32 to affect wavelength (color) output of the panel, and/or diffusing materials included to affect light scattering of the light output from the panel 32. A phosphor, most generally, is a substance that exhibits the phenomenon of luminescence. To emit white light or amber light, the phosphor can include, for example, at least one of the following compounds: $Y_3Al_5O_{12}$: $Ce^{3+}$ (YAG), (Sr, Ba) $2SiO_4$: $Eu^{2+}$, Cax (Si, Al)$_{12}$ (O, N)$_{16}$: $Eu^{2+}$. These compounds convert blue light into yellow light. By adjusting the composition of the phosphor, the additive synthesis of these two colors will be a white light or an amber light.

Properties of the material 325 or the fibers 28 may be chosen to enhance plural light outputs from the panel. For example, material 325 and/or fibers may be physically altered and may include additives as discussed above. In one example, the fiber portion 321 may include abraded or non-abraded optical fibers 28. An unabraded fiber 28 may emit light only at the end of the panel 32 (in a direction A (planar direction) as illustrated by FIGS. 7A-7G), while an abraded fiber 28 may emit light along a length of the fiber to cause panel 32 to emit light from a surface thereof (in a direction A' (axial direction) shown in FIGS. 7A-7G). According to some embodiments of the invention, the fibers 28 of a panel 32 are abraded such that they emit light along a length of the panel, and at the end of the panel 32.

Figure 7A:
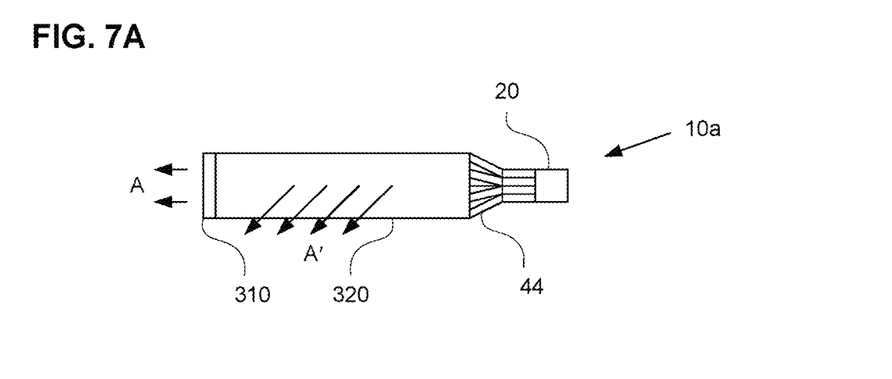
FIGS. 7A-7G are schematic representations of exemplary lighting assemblies, according to embodiments of the invention.

FIG. 7A is a schematic representation of the lighting system 10a, according to one example. In the embodiment of FIG. 7A, the panel 320 is abraded such that a portion of light is output from a side surface of the panel 320 in direction A' and another portion of the light is output from an end of the panel 32 in direction A. As also seen, the panel 320 may be optically coupled to the fiber bundle 44 on a first end, and may be connected to a cap 310 on a second end where an end of one or more fiber bundles 44 terminate. The light source 20 may have a fixed luminosity when operating or be configured to allow luminosity to vary between at least two states of intensity. In one example, a degree of abrasion of the fibers can be selected to ensure that light outputs at A and A' satisfy different automotive lighting functions. Further, optical portions of the panel 320 may be selected or modified to enhance more than one optical output from the panel 32 as discussed above.

In this regard, the cap 310 provides an additional optical component to enhance or alter characteristics of light output in direction A. For example, Cap 310 may be opaque to prevent the emission of light or the cap 310 may be translucent to allow emission of light from the end of one or more fiber bundles 44. The cap 310 may have a light emitting surface on a side positioned in a direction that is substantially different from that of a light emitting surface of the fiber panel 320. As with optical layers 323 and 327 of FIG. 6, the cap 310 may be modified to achieve or enhance different light outputs from the panel 320.

Moreover, spatial effects of the light output in the illumination region 32e may be accomplished by design aspects of the panel 32. Turning again to FIG. 6, conventionally, improvements to fiber optic light panels have focused on achieving a desired light output from the illumination region 32e as a whole. For example, the fiber portion 321, the reflective portion 323 and the transmission portion 327 typically have optical properties which are homogeneous across the area of the panel but optimized to achieve a desired light output from the illumination region 32e. The present inventors, discovered, however, that aspects of the fiber optic panel 32 may be varied to achieve spatial variation of light output characteristics in region 32e. Such spatial variation can be used to obtain different functionality from a single panel and/or to enhance styling of the vehicle.

In some embodiments, one or more of the fiber portion 321, reflecting portion 323 and transmission portion 327 (or the cap 310) can be spatially varied in type or characteristics to achieve a desired light output across an illumination region such as region 32e. In some embodiments, the fiber layer 321, reflective layer 323 and/or transmission layer 327 can be varied in texture, material composition or other physical properties across the panel area to achieve corresponding spatial variation light output characteristics in the illumination region 32e. For example, a texture of the reflective layer 323 can be varied to achieve different degrees of diffusivity across the panel. Further, additives to any portion of the panel 32 can be graded in density and/or type across the panel 32 to achieve spatial effects. Further, different fibers may be arranged on the panel to achieve different light outputs in different regions of the panel. Example arrangements are disclosed in US patent Application titled FIBER OPTIC LIGHTING DEVICE WITH PLURAL LIGHT INPUTS filed on even date herewith by the same Applicant as the present application. The entire contents of this application are incorporated herein by reference.

Variation in a physical property of the panel can be achieved by an integral layer having continuously varying property, and/or by combination of discrete portions to achieve a varying effect. For example, the reflective layer 323 may be made of several discrete sheets having different properties and joined side-by-side to provide a reflective layer for a single panel 32. Further, sub-panels having respective fiber arrays may be at least partially overlapped to form a panel. Thus, the term "panel" refers to a generally continual surface rather than an integral layer or sheet of material.

In one example, ends of the optic fibers 28 of different sub-panels 32 may be bundled and coupled to a single coupler associated with the single light source 20. In such configuration, the light source 20 is optically coupled to the optical fibers 28 from multiple sub-panels 32, and a single light source 20 can be used with multiple panels 32. Further, the sub-panels may have different characteristics to achieve different light outputs. For example a first sub-panel may have a filter to achieve a first light output color, while a second sub-panel may have a another filter to achieve a different color. The sub-panels may be positioned back-to-back to achieve a first light output from illumination region 32 to satisfy a first vehicle lighting function, and a second light output from an opposite side of the panel 32 to satisfy a different lighting function.

Figure 7B:
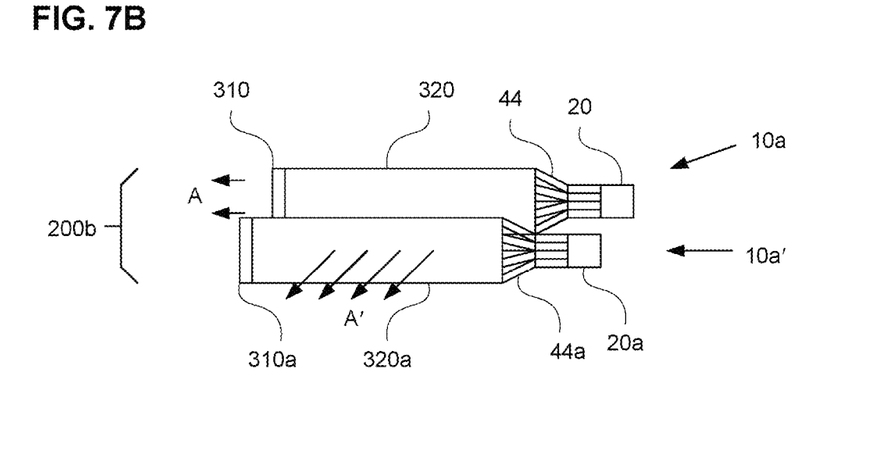

Further, more than one light sources may be used to provide light to one or more sub-panels. FIG. 7B is a schematic representation of a lighting assembly 200b, according to one example. The lighting assembly 200b comprises a first lighting system 10a and a second lighting system 10a', the second lighting system 10a' positioned facing outwardly from a rear of a vehicle V and covering a layer comprising the first lighting system 10a, which is oriented the same way.

In one example, the first lighting system 10a comprises a fiber bundle 44 providing a fiber layer that is non-abraded and a cap 310 that is translucent to allow light from the second end of the fiber bundle 44 to be emitted in the direction A. As used herein an "abraded fiber bundle" is a fiber bundle associated with a fiber layer 321 which has abraded fibers, although the bundled portion of the panel is typically not abraded. The second lighting system 10a' is similar to the first lighting system 10a but has a cap 310a that is opaque or reflective to prevent light emission at an end of the fiber bundle 44a, the fiber bundle 44a being abraded to emit light through a surface of the fiber panel 320a in the direction A'. One use of this lighting assembly 200b may be as a tail lamp and side marker lamp.

Figure 9:
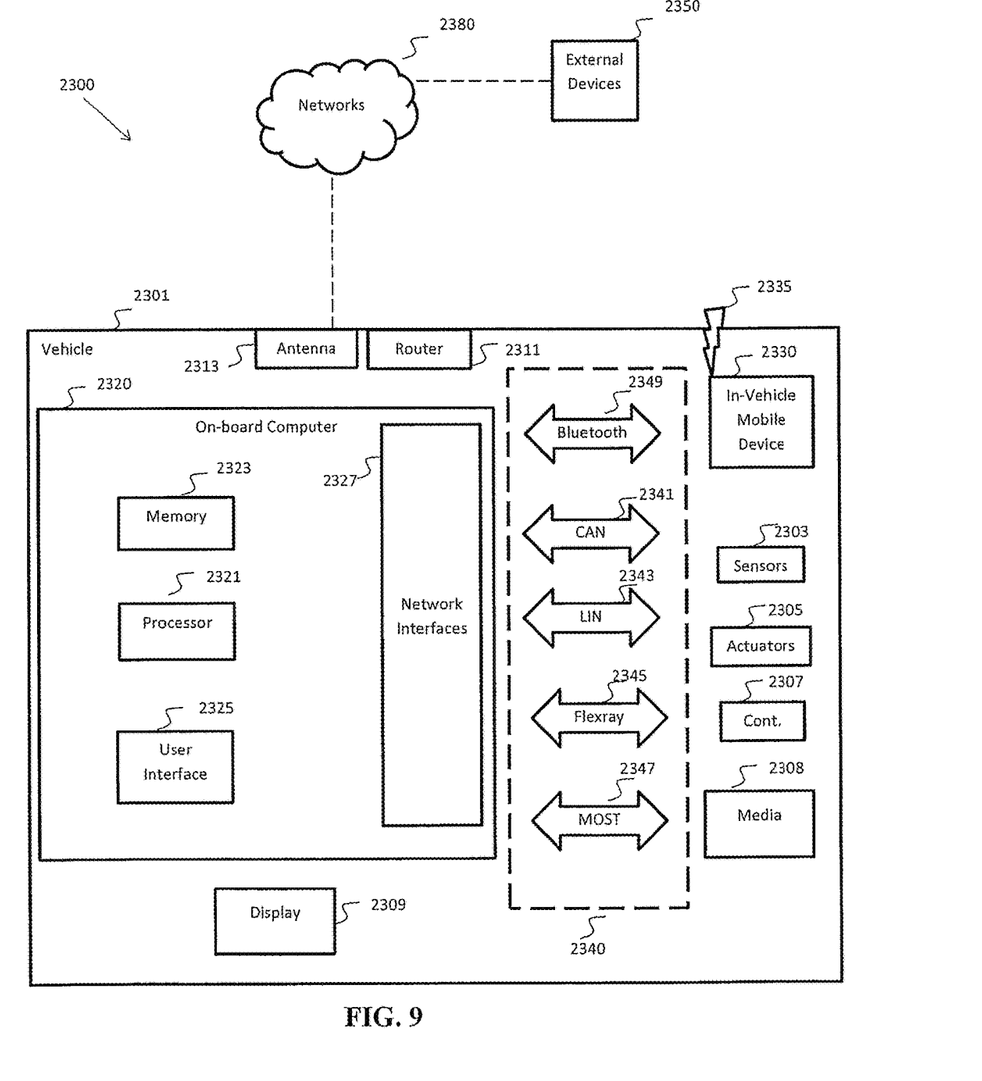
FIG. 9 is a simplified block diagram of a vehicle environment in which embodiments of the invention disclosed herein may be implemented.

In another example, the cap 310a may be translucent to also allow light emission at an end of the fiber bundle 44a. In another example, the fiber bundle 44 may be abraded and also transmit light through the fiber panel 320 in the direction A, allowing the lighting assembly 200b to also function as a stop lamp. A controller or processor such as shown in FIG. 9 may be used to control lighting of sources 20 and 20a to achieve different lighting effects. Further, control of the sources may be based on data received from any element (such as a vehicle device) of the vehicle environment of FIG. 9.

In a case where the fiber bundle 44 and the second fiber bundle 44a are similarly abraded, activation of either the first light source 20 or a second light source 20a, respectively, may illuminate a fiber panel 320, 320a. Simultaneous activation of the light source 20 and the light source 20a can increase the luminosity of the fiber panel 320, 320a for example, by an amount sufficient for a lighting assembly 200 to function as a stop lamp.

As noted, an end of the fiber panel 320, 320a may be connected to an end optic, such as a cap, to alter intensity, opacity, color, and style of the fiber panel 320, 320a or an end of the fiber panel 320, 320a. The cap may, for example, be opaque, translucent, or transparent. If the cap connected to the side of the fiber panel 320 is opaque then light from the end of the fiber bundle 44 is prevented from fully emitting from the fiber bundle 44, and the end of the fiber panel 320 may be prevented from emitting light. If the cap is translucent then light from the end of the fiber bundle 44 may be emitted from the side of the fiber panel 320 through the cap.

Intensity of light output of a light assembly may be increased, generally either by increasing power to, and therefore luminosity of, the light source 20 or with the aid of the second light source 20a of appropriate color.

Figure 7C:
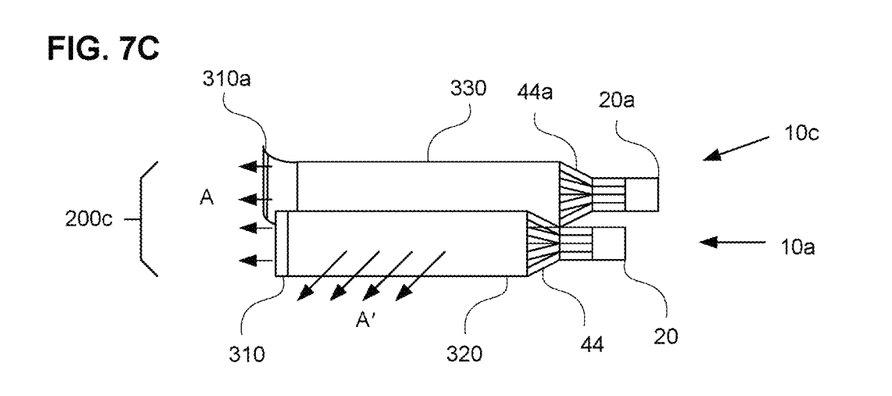

FIG. 7C is a schematic representation of a lighting assembly 200c, according to one example. The lighting assembly 200c comprises a first lighting system 10a and a second lighting system 10c, the first lighting system 10a positioned facing outwardly from a rear of the vehicle V and covering a layer comprising the second lighting system 10c, which is oriented the same way.

In one example, the first lighting system 10a comprises a fiber bundle 44 that is non-abraded and a cap 310 that is translucent to allow light from an end of the light source 20 to be emitted in the direction A. The second lighting system 10c is similar to the lighting system 10a', except a fiber panel 330 is used instead of the fiber panel 320a. The fiber panel 330 is curved at a an end such that light from an abraded fiber bundle 44a may be optically connected to and configured to emit light through the fiber panel 330 in more than one direction and plane, for example, in the A and A' directions.

The second lighting system 10c has a cap 310a that is opaque to prevent light emission at the second end of the fiber bundle 44a toward a direction opposite direction A', the fiber bundle 44a being abraded to emit light through a surface of the fiber panel 330 in the directions A, A'. One use of this lighting assembly 200 may be as a tail lamp and turn signal indicator.

In another example, the cap 310a may be translucent to also allow light emission at an end of the fiber bundle 44a. In another example, the fiber bundle 44 may be abraded and also transmit light through the fiber panel 320 in the direction A, allowing the lighting assembly 200c to also function as a stop lamp.

Figure 7D:
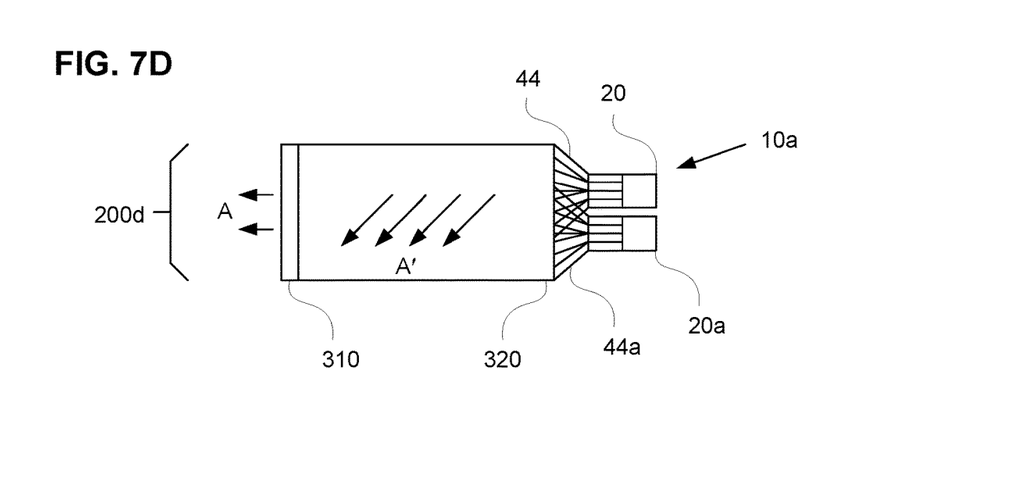

FIG. 7D is a schematic representation of a lighting assembly 200d, according to one example. The lighting assembly 200d comprises the first lighting system 10a as that of FIG. 7A, and further comprising a second light source 20a and a second fiber bundle 44a having a fiber layer overlapping with a first fiber bundle 44 and optically connected to the same fiber panel 320.

In one example, the first lighting system 10a comprises the fiber bundle 44 that is abraded and a cap 310 that is translucent to allow light from an end of the fiber bundle 44 to be emitted in a direction A. The second fiber bundle 44a and the second light source 20a are configured to be operated independently of the first lighting system 10a to allow additional functionality.

In one example, the fiber bundle 44a is abraded to also emit light through a surface of the fiber panel 320 in the direction A'. One use of this lighting assembly 200d may be as a tail lamp and a stop lamp.

In another example, the fiber bundle 44 may be non-abraded so as to only transmit light through an end of the fiber bundle 44 in the direction A.

In another example, the cap 310a may be opaque to prevent light emission at the end of the first fiber bundle 44 and the second fiber bundle 44a.

Figure 7E:
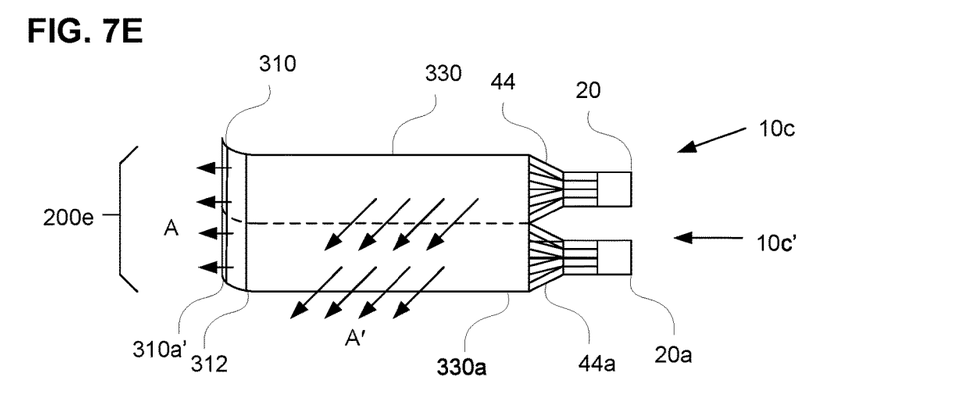

FIG. 7E is a schematic representation of a lighting assembly 200e, according to one example. The lighting assembly 200e comprises a first lighting system 10c and a second lighting system 10c', the second lighting system 10c' positioned below the first lighting system 10c. Both the first and second lighting systems 10c, 10c' are the same as that of FIG. 7C.

In one example, the first lighting system 10c may comprise a fiber bundle 44 and a cap 310 that is opaque to prevent light emission at an end of the fiber bundle 44, the fiber bundle 44 abraded to emit light through the fiber sub-panel 330 in more than one direction and plane, for example, in the A and A' directions.

The second lighting system 10c' may be similar to the lighting system 10c. The fiber sub-panel 330a is curved at an end such that an abraded fiber bundle 44a may be optically connected to and configured to emit light from the light source 20a through the fiber sub-panel 330a in more than one direction and plane, for example, in the A and A' directions.

The second lighting system 10c' may have a cap 310 that is opaque to prevent light emission at an end of the fiber bundle 44a, the fiber bundle 44a abraded to emit light through a surface of the fiber sub-panel 330a in the direction A'. One use of this lighting system 10c may be as a tail lamp and a turn signal indicator.

In another example, the lighting assembly 200e may have a transition 312 between a curved region is a different color from a substantially flat region of the fiber sub-panels 330, 330a. Further, if one of the fiber bundles 44, 44a is abraded and one is unabraded, the abraded fiber bundle 44 or 44a is optically connected only to the substantially flat region of at least one of the fiber sub-panels 330, 330a, and the unabraded fiber bundle 44 or 44a is optically connected only the curved region of at least one of the fiber sub-panels 330, 330a, then the lighting assembly 200e may provide two independent lighting functions within at least one of the fiber sub-panels 330, 330a. Such lighting functions may include, depending on colors of various regions of the fiber panels 330, 330a, a tail lamp, turn signal indicator, a side marker light, back up lamp, and license plate lamp.

In another example, the cap 310a' may be translucent to also allow light emission at an end of the fiber bundle 44a.

In some cases the lighting assembly 200e may not have a cap 310. Instead, ends of the fiber bundles 44, 44a may terminate in another part, such as a panel of the vehicle, and light emission may be prevented by another part where light not of the fiber sub-panels 330, 330a may be blocked.

Figure 7F:
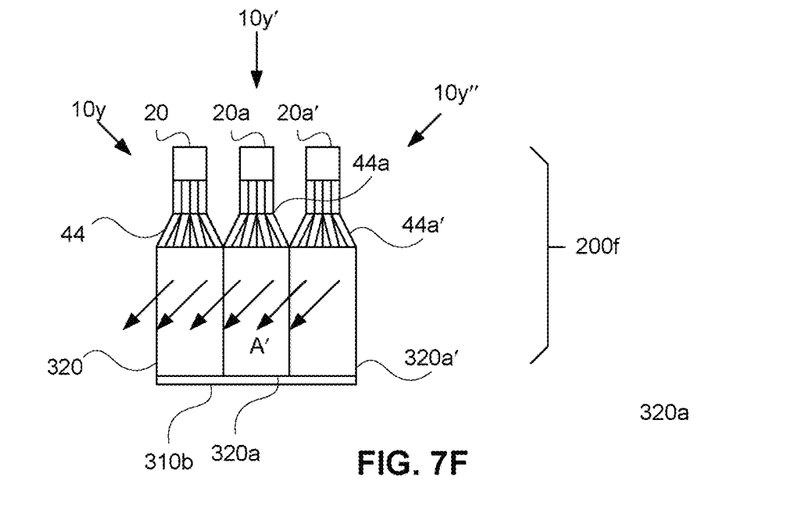

FIG. 7F is a schematic representation of a lighting assembly 200f, according to one example. The lighting assembly 200f comprises a first lighting system 10y, a second lighting system 10y', and a third lighting system 10y'', each the same as and orthogonal to the lighting system 10a illustrated by FIG. 7A. The lighting systems 10y, 10y', 10y'' are positioned adjacent to one another and all share a cap 310b instead of each lighting system 10y, 10y', 10y'' having a sub-panel with a respective cap 310.

The lighting assembly 200f may function as a tail lamp when at least one of the lighting systems 10y, 10y', 10y'' is illuminated, and may function as a stop lamp when one or two of the lighting systems 10y, 10y', 10y'' is illuminated due to actuation of a vehicle brake system. Further, the lighting assembly 200f may function as a turn signal indicator in at least two ways. In one case, the lighting assembly 200f functions as a turn signal indicator when at least one of the lighting systems 10y, 10y', 10y'' is alternately illuminated and then powered off (not illuminated) in a blinking manner. In another case, the lighting assembly 200f functions as a sequential left turn signal indicator when one of the lighting systems 10y, 10y', 10y''', for example, the lighting system 10y''' is illuminated. The lighting system 10y' is subsequently illuminated, and then the lighting system 10y is subsequently illuminated. When the lighting system 10y' is illuminated the lighting system 10a may be powered off, when the lighting system 10y''' is illuminated the lighting system 10y' may be powered off, and when the lighting system 10y is illuminated the lighting system 10y''' may be powered off.

Then all three lighting systems 10y, 10y', 10y''' may be powered off. This sequence then repeats for the duration of use of the turn signal indicator function. For a right turn signal indicator function, the sequence of lighting system 10y, 10y', 10y''' illumination may be reversed.

Figure 7G:
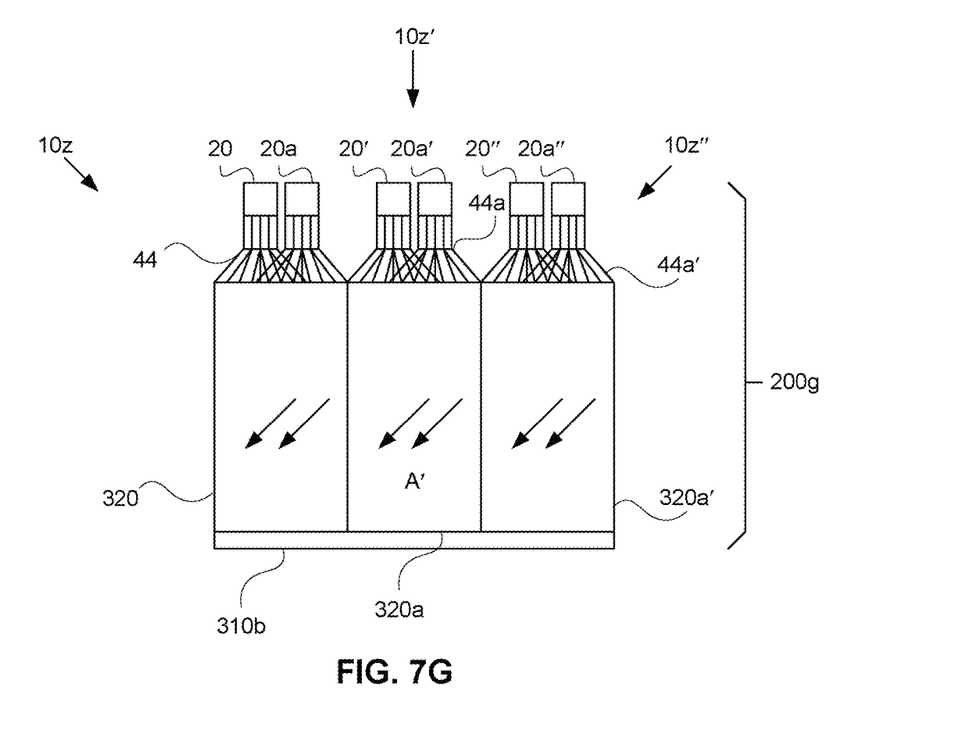

FIG. 7G is a schematic representation of a lighting assembly 200g, according to one example. The lighting assembly 200g comprises a first lighting system 10z, a second lighting system 10z', and a third lighting system 10z'', each similar to and orthogonal to the lighting system 10a illustrated by FIG. 7D. The lighting systems 10z, 10z', 10z'' are positioned adjacent to one another and all share a cap 310b instead of lighting system 10z, 10z', 10z'' each having a cap 310.

The lighting assembly 200g may function as a turn signal indicator or a sequential turn signal indicator as in FIG. 7F using the first light source 20, 20', 20'' of each lighting system 10z, 10z', 10z'', respectively. The lighting assembly 200g may function as a combination tail lamp and stop lamp by illuminating a first light source 20, 20', 20'' from one or more lighting systems 10z, 10z', 10z'', respectively, when used as a tail lamp. The lighting assembly 200g may also function as a stop lamp by illuminating a second light source 20a, 20a', 20a'' from one or more lighting systems to function as a stop lamp during actuation of a vehicle brake system. Pulse Width Modulation (PWM) may be used to produce a difference in light output between a first operating condition where the first light source 20, 20', 20'' may be the only light source used, and a second operating condition where the first light source 20, 20', 20'' and the second light source 20a, 20a', 20a'' may both be used. The second operating condition may be much brighter, in one example, up to approximately a factor of ten relative to the first operating condition.

A controller or processor such as shown in FIG. 9 may be used to control lighting of sources in any of the embodiments discussed above. Further, control of the sources may be based on data received from any element (such as a vehicle device) of the vehicle environment of FIG. 9, and may be based on control logic stored or obtained from any element in FIG. 9.

Figure 8A:
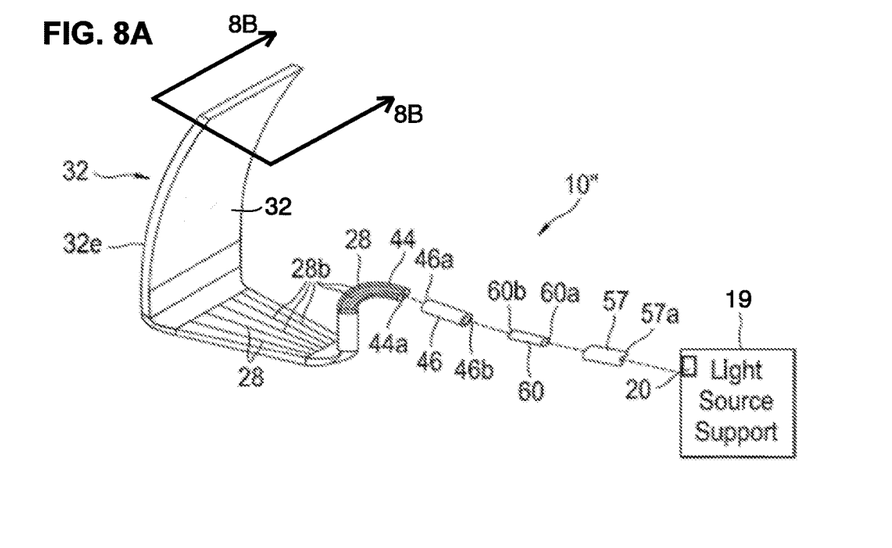
FIG. 8A is an exploded view drawing showing the components of an exterior vehicle lighting device in accordance with an embodiment of the invention.

FIG. 8A is an exploded view showing arrangement of the components of a vehicle lighting device in accordance with an embodiment of the invention. FIG. 8C illustrates a vehicle V equipped with a lighting system 10 in a headlight or a taillight, in accordance with an embodiment of the invention. As seen in FIG. 8A, the system 10' includes a panel 32 having a light emitting side 32e through which light from the plurality of optical fibers 28 is emitted, and a light reflecting side 32c which may be partially or fully coated with a reflective material in order to reflect light through side 32e as discussed above.

Figure 8B:
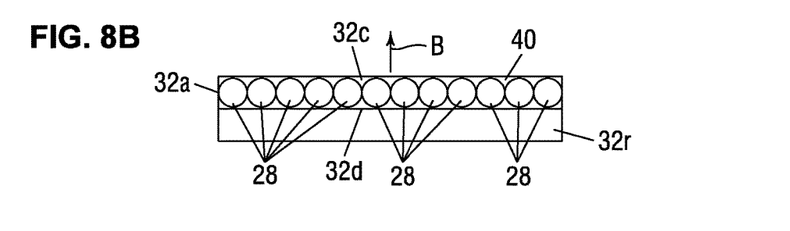
FIG. 8B is a view of a vehicle including a fiber optic light panel device according to embodiments of the invention.
Figure 8C:
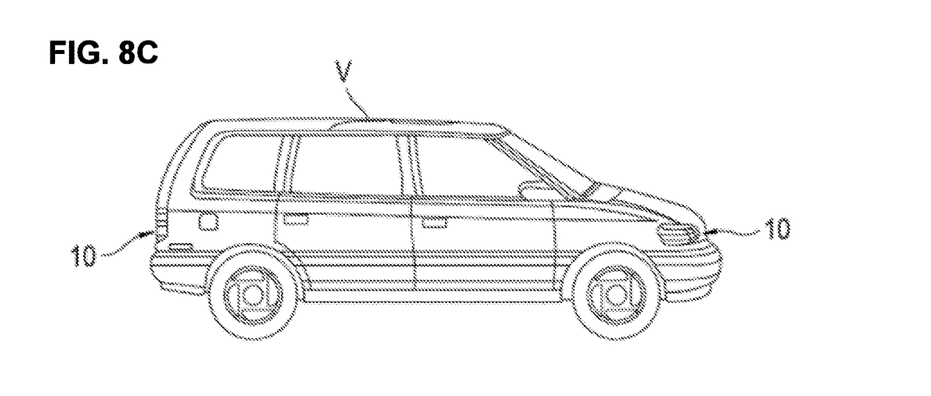
FIG. 8C illustrates a vehicle equipped with a lighting system in a headlight or a taillight, in accordance with an embodiment of the invention.

FIG. 8B is a sectional view of the panel of FIG. 8A. As seen, fibers 28 are arranged in a fiber array and embedded in a substrate 40, which could be a polymer, resin or other conventional substrate. Portions 28b of the plurality of optical fibers 28 extend out of the substrate 40 and panel 32 and are gathered and combined in a fiber bundle 44 to define a light-receiving end or input end 44a. In the embodiment of FIG. 8A, the input end 44a becomes operatively positioned in a first end 46a of a mechanical coupler 46 having opposing end 46b. The coupler 46 may be a ferrule and include a wrap, sleeve, adhesive, tape, resin or the like to facilitate holding the fibers 28 in the bundled position illustrated in FIG. 5B.

Optical coupler 60 has a first and second ends 60a and 60b. The first end 60a is mechanically coupled to, and received in, a hollow plug 57. Second end 60b is received in the second end 46b of coupler 46 to optically align coupler/60 to the fiber bundle 44. During assembly, an end 57a of the plug 57 is coupled to the light source support of a vehicle light housing to provide optical coupling with the light source 20. In the illustration, the optical coupler 60 is an integral one piece construction made of silicone or plastic. The optical coupler 60 may be an optical mixer configured to improve a homogeneous property of light coupled to the fiber bundle as disclosed in the patent application titled FIBER OPTIC LIGHT PANEL WITH HOMOGENEOUS LIGHT OUTPUT, filed by the present Applicants on common date herewith. The entire contents of this application is incorporated herein by reference.

Advantageously the embodiments described herein are particularly suited for exterior lighting and in environments where it is necessary that the lighting match or conform to the contour or styling of the vehicle V.

FIG. 9 is a simplified block diagram of a vehicle environment in which embodiments of the invention disclosed herein may be implemented. The vehicle environment 2300 includes a vehicle 2301 in communication with one or more external devices 2350 by way of one or more external networks 2380. Vehicle 2301 also includes various internal networks 2340 for interconnecting several vehicle devices within the vehicle as will be discussed below. The vehicle environment 2300 may also include one or more in-vehicle mobile device 2330. External devices 2350 include any device located outside the vehicle 2301 such that the external device must communicate with the vehicle and its devices by an external network 2380. For example, the external devices may include mobile devices, electronic devices in networked systems (e.g., servers or clients in a local area network (LAN), etc.), on board computers of other vehicles etc. In-vehicle mobile devices 2330 are devices which are located within, or in the vicinity of the vehicle 2301 such that the in-vehicle mobile device can communicate directly with internal networks 2340 of the vehicle 2301. In-vehicle mobile devices 2330 may also connect with external networks 2380 as discussed below.

Vehicle 2301 includes vehicle devices integral with or otherwise associated with the vehicle 2301. In the embodiment of FIG. 9, vehicle devices include one or more sensors 2303, one or more actuators 2305, one or more control units 2307, one or more media systems 2308, one or more displays 2309, one or more routers 2311, one or more antenna 2313, and one or more on board computers 2320. As used herein, the term "vehicle device" is meant to encompass sensors, actuators, controllers, electronic control units (ECUs), detectors, instruments, embedded devices, media devices including speakers, a CD and/or DVD player, a radio, etc, vehicle navigation systems (e.g., GPS) displays, other peripheral or auxiliary devices or components associated with the vehicle 2301.

Sensors 2303 detect various conditions within (or in the immediate vicinity of) the vehicle 2301. For example, sensors 2303 may be temperature sensors, photosensors, position sensors, speed sensors, angle sensors or any other sensor for detecting a diagnostic condition or other parameter of the vehicle 2301 or its ambient environment. Sensors 2303 may be passive or "dumb" sensors that provide an analog representative of the sensed parameter, or so called "smart" sensors with integrated memory and digital processing capability to analyze the parameter sensed within the sensor itself. Actuators 2305 cause motion of some mechanical element of the vehicle in response to a control signal. For example, actuators 2305 may be hydraulic actuators, pneumatic actuators or electrical/electronic actuators such as a stepper motor. Actuators 2305 may be used to move vehicle lighting devices to implement intelligent light, for example.

Actuators 2305 may also be "dumb" devices that react to a simple analog voltage input, or "smart" devices with built-in memory and processing capability. Actuators 2305 may be activated based on a sensed parameter from sensors 2303, and one such sensed parameter may be a physical position of the actuator 2303 itself. Thus, the sensors 2303 and actuators 2305 may be connected in a feedback control loop for diagnostic detection and control of the vehicle 2301.

Control units 2307 include any embedded system, processor, electronic control unit (ECU) or microcontroller. Control unit 2307 may be dedicated to a specific region or function of the vehicle 2301. For example, control unit 2307 can provide memory and control logic functions for several dumb devices, such as passive sensors 2303 and actuators 2305. In one embodiment, control unit 2307 is an ECU dedicated for controlling one or more lighting devices according to embodiments disclosed herein. Typically, numerous ECUs, with different embedded software, may be found in a single automobile and may communicate via internal networks as discussed below.

On-board computer 2320 is a vehicle device for providing general purpose computing functionality within the vehicle 2301. The on-board computer 2320 typically handles computationally intensive functions based on software applications or "apps" loaded into memory. On-board computer 2320 may also provide a common interface for different communication networks in the vehicle environment 2300. On-board computer 2320 includes one or more processor 2321, one or more memory 2323, one or more user interface 2325, and one or more network interface 2327. One or more display 2309 and one or more router 2311 may be an integral part of the on board computer 2310, or distributed in the vehicle and associated with the on-board computer and other vehicle devices. Separate displays 2309 may be provided in suitable locations for access by a driver and passengers in the vehicle 2301.

On-board computer 2320, and other associated or integrated components such as vehicle devices can include one or more memory element 236 for storing information to be used in achieving operations associated with control of fiber optic light panels as disclosed herein. Further, these devices may keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in vehicle environment 2300 could be provided in any database, register, table, cache, queue, control list, or storage structure, based on particular needs and implementations, all of which could be referenced in any suitable timeframe.

In example embodiments, the operations for controlling fiber optic light devices may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar vehicle device, etc.). In some of these instances, one or more memory elements (e.g., memory 2323) can store data used for the operations described herein. This includes the memory elements being able to store software, logic, code, or processor instructions that are executed to carry out the activities described in this Specification.

Processor 2321 can execute software or algorithms to perform activities to enable control of lighting devices disclosed herein. A processor 2321 can execute any type of instructions associated with the data to achieve the operations detailed herein. In one example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of computer-readable mediums suitable for storing electronic instructions. Any of the potential processing elements, modules, microprocessors, digital signal processors (DSPs), and other devices described herein should be construed as being encompassed within the broad term 'processor.'

Elements of FIG. 9 may be communicatively coupled to one another by one or more suitable communications medium (wired, wireless, optical) that provides a pathway for electronic communications. Any element in FIG. 9 may act as a network node in communication with any other element of FIG. 9 also acting as a network node. Any suitable network messaging protocol, network topology or network geographic scope may be included in the vehicle environment 2300. Thus, embodiments of on-board computer 10 may include one or more distinct interfaces, represented by network interfaces 2327, to facilitate communication via the various networks (including both internal and external networks) described herein. Such network interfaces 2327 may be inclusive of multiple wireless interfaces (e.g., WiFi, WiMax, 3G, 4G, white space, 802.11x, satellite, Bluetooth, LTE, GSM/HSPA, CDMA/EVDO, DSRC, CAN, GPS, etc.). Other interfaces represented by network interfaces 26, may include physical ports (e.g., Ethernet, USB, HDMI, etc.), interfaces for wired and wireless internal subsystems, and the like. Similarly, each of the nodes of vehicle environment 2300 can also include suitable interfaces for receiving, transmitting, and/or otherwise communicating data or information in the vehicle environment 2300.

Multiple internal vehicle networks represented by 2340 may exist in the vehicle 2301 to provide communication pathways to various vehicle devices distributed throughout the vehicle 2301. An internal vehicle network 2340 is a collection of nodes, such as vehicle devices, integrated with or otherwise linked to the vehicle and interconnected by communication means. Vehicle networks 2340 typically include hard wired bus type networks, each providing communication pathways to particular vehicle devices distributed throughout a vehicle. FIG. 9 shows four examples of such hard wired networks: Controller Area Network (CAN) 2341, Local Internet Network (LIN) 2343, Flexray bus 2345, and Media Oriented System Transport (MOST) network 2347.

CAN bus 2341 uses a message based protocol, designed for and typically used by automotive applications. The CAN bus 2341 is a vehicle bus standard designed to allow microcontrollers, sensors, and other devices to communicate with each other via the CAN without a host computer. CAN protocol may be used for soft real-time control of devices such as a vehicle antilock braking system. For example, CAN bus 2341 may connect a transmission sensor and an energy sensor to a main engine controller, and a different CAN bus may connect the main engine controller and a main body controller to on-board computer 2320. LIN network 2343, may be used to sense external conditions such as light, or to control small mechanisms such as door locking systems. For example, LIN bus 2343 may connect a driver's seat actuator, temperature controls, and windshield wiper actuators to a main body controller of a CAN bus.

Flexray bus 2345 is typically a dedicated network for hard real-time controllers, used for drive-by-wire and/or brake-by-wire applications in which information from the engine and/or wheels of the vehicle 2301 is collected and transmitted to appropriate applications and/or data repositories. For example, Flexray bus 2345 may connect a chassis module of the vehicle 2301 to on-board computer 2320 through an appropriate interface, and/or may connect brakes and electronic stability control (ESB) to the chassis module attached to Flexray 2345. MOST network 2347 can also be found in vehicles for transmitting audio, video, and voice on fiber optics. MOST buses 2347 can connect media system 2308, to on-board computer 2320 through appropriate interfaces, and/or connect a reversing camera and a navigation system to an intermediate device which is connected to computer by MOST bus 2347.

Other hard wired internal networks such as Ethernet may be used to interconnect vehicle devices in the vehicle. Further, internal wireless networks 2349, such as near field communications, Bluetooth etc may interconnect vehicle devices.

External networks 238 may be accessed from vehicle 2301 by vehicle devices and in-vehicle mobile devices 2330 when a communication link is available. In-vehicle mobile devices 2330 include mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within vehicle environment 2300. Data, may be any type of numeric, voice, video, or script data, or any type of source or object code, or any other suitable information in any appropriate format that may be communicated from one point to another in electronic devices and/or networks. A vehicle router 2311 may also be used to access external network infrastructure within range of the antenna 2313 of vehicle 2301.

Some form of wireless communication is needed to achieve external network connectivity from vehicle 2301. For example third generation (3G), fourth generation (4G), and 3GPP long term evolution (LTE) wireless telephone technologies, worldwide interoperability for microwave access (WiMax), WiFi, and dedicated short-range communications (DSRC) are some of the numerous wireless technologies currently available with the appropriate interfaces and network infrastructure to support the technology.

Users (driver or passenger) may initiate communication in vehicle environment 2300 via some network, and such communication may be initiated through any suitable device such as, in-vehicle mobile device 2330, display 2309, user interface 2325, or external devices 2350.

In-vehicle mobile devices 2330, and mobile devices external to vehicle 2301, may communicate with on-board computer 2320 through any wireless or wired communication link and may be configured as a personal area network (PAN) or a wireless personal area network (WPAN) or any other appropriate networking architecture or system that facilitates communications in a network environment. Wired and wireless communication links may any electronic link such as Bluetooth, wireless technologies (e.g., IEEE 802.11x), a USB cable, an HDMI cable, etc. In one example, an external mobile device may be connected to computer 232 through a USB cable or wireless network when, for example, the external mobile device is a diagnostic tool used by a mechanic for servicing vehicle 10.

This invention, including all embodiments shown and described herein, could be used alone or together and/or in combination with one or more of the features covered by one or more of the claims set forth herein, including but not limited to one or more of the features or steps mentioned in the Summary of the Invention and the claims. In particular, one skilled in the art will understand that the invention disclosed herein could be applied in accordance with vehicle safety standards such as Federal Motor Vehicle Safety Standards (FMVSS) No. 108, as well as corresponding regulations in Europe, Japan, China and other parts of the world.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

The invention claimed is:

1. A lighting module for a vehicle, comprising:
a light source; and
a panel optically coupled to the light source and comprising a plurality of fibers, wherein the panel includes a first illumination region of first light output for a first vehicle lighting function, the first light output being provided via planar light emission from the plurality of fibers, and
a second illumination region of second light output for a second vehicle lighting function wherein a distal end of the plurality of fibers is connected to a cap forming an end of the panel and the cap providing the second light output via axial light emission from the distal end of the plurality of fibers for the second vehicle lighting function.

2. The lighting module of claim 1, wherein the plurality of fibers comprises an array of fibers that is abraded.

3. The lighting module of claim 2, wherein at least one portion of the panel is curved.

4. The lighting module of claim 2, wherein the panel has at least one region emitting one of a red, amber, and white light output color.

5. The lighting module of claim 2, wherein the panel comprises at least one portion emitting a red light output color, and the lighting module functions as a tail lamp by illuminating the light source.

6. The lighting module of claim 2 wherein the panel comprises at least one portion emitting one of a red and amber color, and the lighting module functions as a turn signal indicator by alternately illuminating the light source.

7. The lighting module of claim 2 further comprising a second light source and a second array of fibers coupled to the second light source, wherein the second fiber array is disposed behind the first fiber array, and the second fiber array is configured to emit light axially at an end of the second fiber array.

8. The lighting module of claim 7, wherein the second fiber array is abraded and also emits light in a planar direction through the panel.

9. The lighting module of claim 8, wherein the second fiber array is interwoven with the first fiber array, and both the first and second fiber arrays may independently emit light through a common portion of the panel.

10. The lighting module of claim 8, wherein the second fiber array is disposed adjacent to the first fiber array such that light emitted by the first fiber array is emitted through a first portion of the panel, and light emitted by the second fiber array is emitted through a second portion of the panel.

11. The lighting module of claim 8, wherein the panel comprises a sub-panel having another fiber array and disposed on a first side with the array of fibers and substantially parallel to at least a portion of the panel.

12. The lighting module of claim 1, wherein at least one portion of the cap is translucent, emits one of a red and amber color, and the lighting module functions as a side marker lamp by illuminating the second light source.

13. The lighting module of claim 1, wherein a portion of the panel includes nanoparticles to enhance at least one of the first and second light outputs.

14. A method of manufacturing a lighting module for a vehicle, comprising:
providing a light source for generating light;
providing a panel optically coupled to the light source and comprising a plurality of optical fibers arranged in a predetermined form to define a plurality of illumination regions from which light is emitted to satisfy a plurality of respective vehicle lighting functions of a fiber array wherein a distal end of the plurality of fibers is connected to a cap forming an end of the panel and the cap providing a first light output via axial light emission from the distal end of the plurality of fibers for a vehicle lighting function, and wherein a second light output is provided via planar light emission from the plurality of fibers.

15. The method of claim 14, further comprising the step of providing a second light source, wherein said providing a panel comprises providing a panel having a first fiber array, coupled to the first light source and coupled to the second light source such that a second fiber array emitting second light from the fiber panel.

16. The method of claim 15 wherein the second fiber array is abraded and may also emit light in a planar direction through the first fiber array.

17. The method of claim 14 wherein at least one portion of the cap is translucent, having one of a red and amber color.

* * * * *